(12) United States Patent
Zargahi et al.

(10) Patent No.: US 11,023,517 B2
(45) Date of Patent: Jun. 1, 2021

(54) DISTRIBUTED COMPUTING SYSTEM WITH A SYNTHETIC DATA AS A SERVICE FRAMESET ASSEMBLY ENGINE

(71) Applicant: MICROSOFT TECHNOLOGY LICENSING, LLC, Redmond, WA (US)

(72) Inventors: Kamran Zargahi, Bellevue, WA (US); Michael John Ebstyne, Seattle, WA (US); Pedro Urbina Escos, Seattle, WA (US); Stephen Michelotti, Ellicott City, MD (US); Emanuel Shalev, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 15/995,116

(22) Filed: May 31, 2018

(65) Prior Publication Data

US 2020/0372120 A1 Nov. 26, 2020

(51) Int. Cl.
*G06K 9/00* (2006.01)
*G06F 16/583* (2019.01)
*G06F 16/27* (2019.01)
*G06N 20/00* (2019.01)
*H04L 29/08* (2006.01)

(52) U.S. Cl.
CPC ............ *G06F 16/583* (2019.01); *G06F 16/27* (2019.01); *G06N 20/00* (2019.01); *H04L 67/10* (2013.01)

(58) Field of Classification Search
None
See application file for complete search history.

(56) References Cited

U.S. PATENT DOCUMENTS 10,235,601 B1 * 3/2019 Wrenninge .......... G06K 9/6256
2016/0328421 A1 * 11/2016 Sarratori ................ G06F 16/54

FOREIGN PATENT DOCUMENTS

JP 2016151975 A 8/2016
WO 2019129819 A1 7/2019

OTHER PUBLICATIONS

PRWeb "AI.Reverie Emerges from Stealth Mode and Officially Launches Proprietary Simulation Platform to Train Machine Learning Algorithms" http://www.prweb.com/releases/2018/05/prweb15471141.htm (May 8, 2018). (Year: 2018).*

(Continued)

*Primary Examiner* — Andrew M Moyer
(74) *Attorney, Agent, or Firm* — Shook, Hardy & Bacon L.L.P.

(57) ABSTRACT

Various embodiments, methods and systems for implementing a distributed computing frameset assembly engine are provided. Initially, a synthetic data scene is accessed. A first set of values for scene-variation parameters is determined. The first set of values is automatically determined for generating a synthetic data scene frameset. The synthetic data scene frameset is generated based on the first set of values. The synthetic data scene frameset comprises at least a first frame in the frameset comprising the synthetic data scene updated based on a value for a scene-variation parameter. The synthetic data scene frameset is stored.

20 Claims, 16 Drawing Sheets

(56) References Cited

OTHER PUBLICATIONS

Hunt, "Amazon SageMaker—Accelerating Machine Learning," https://aws.amazon.com/blogs/aws/sagemaker/ (Nov. 29, 2017). (Year: 2017).*
"International Search Report and Written Opinion Issued in PCT Application No. PCT/US19/32949", dated Sep. 25, 2019, 28 Pages.
"International Search Report and Written Opinion Issued in PCT Application No. PCT/US19/32949", dated Sep. 25, 2019, 25 Pages.

* cited by examiner

FIG. 5

DISTRIBUTED COMPUTING SYSTEM WITH A SYNTHETIC DATA AS A SERVICE FRAMESET ASSEMBLY ENGINE

BACKGROUND

Users rely on different types of technological systems to accomplish tasks. Technological systems may be improved based on machine-learning that uses statistical techniques to give computers the ability progressively improve performance of a specific task with data, without being explicitly programmed. For example, machine learning can be used for data security, personal security, fraud detection, healthcare, natural language processing, online searching and recommendations, financial trading and smart cars. For each of these fields or domains, machine learning models are trained with training datasets that are example sets of data used to create the framework for matching learning tasks and machine learning applications. For example, facial recognition systems can be trained to compare the unique features of a person's face to a set of known features of faces to properly identify the person. With the ever-increasing use of machine learning in different fields, and the importance of properly training machine learning models, improvements to computing operations of a machine learning training system would provide more efficient performance of machine learning tasks and applications and improve user navigation of graphical user interfaces of machine learning training systems.

SUMMARY

Embodiments of the present invention relate to methods, systems, and computer storage media for providing a distributed computing system that supports synthetic data as a service. By way of background, distributed computing systems may operate based on service-oriented architecture, where services are provided using different service models. At a high level, a service model may offer abstraction from underlying operations associated with providing the corresponding service. Examples of service models include Infrastructure as a Service, Platform as a Service, Software as a Service, and Function as a Service. With any of these models, customers develop, run, manage, aspects of the service without having to maintain or develop operational features that are abstracted using the service-oriented architecture.

Turning to machine learning and training datasets, machine-learning uses statistical techniques to give computers the ability progressively improve performance of a specific task with data, without being explicitly programmed. Training datasets are an integral part of the field of machine learning. High-quality datasets can help improve machine learning algorithms and computing operations associated with machine learning hardware and software. Creating a high-quality training dataset may take a significant amount of effort. For example, labeling data for a training dataset can be particularly tedious which often leads inaccuracies in the labeling process.

Conventional methods for finding training datasets fall significantly short when it comes to democratizing or making training datasets universally available for use across several different domains. Moreover, theoretical solutions for developing machine-learning training datasets simply have not been fully defined or described because the infrastructure for implementing such solutions is inaccessible or far too expensive to undertake to realize alternatives to current techniques for developing training datasets. Overall, comprehensive functionality around developing machine-learning training datasets is limited in conventional machine-learning training services.

Embodiments described in the present disclosure are directed towards technologies for improving access to machine-learning training datasets using a distributed computing system that provides synthetic data as a service ("SDaaS"). SDaaS may refer to a distributed (cloud) computing system service that is implemented using a service-oriented architecture to provide machine-learning training services while abstracting underlying operations that are managed via the SDaaS service. For example, the SDaaS provides a machine-learning training system that allows customers to configure, generate, access, manage and process synthetic data training datasets for machine-learning. In particular, the SDaaS operates without the complexity typically associated with manual development of training datasets. SDaaS can be delivered in a number ways based on SDaaS engines, managers, modules or components, which include asset assembly engine, scene assembly engine, frameset assembly engine, frameset package generator, frameset package store, feedback loop engine, and crowdsourcing engine. The observable effect of implementing the SDaaS as a service on a distributed computing system is the mass production and availability of synthetic data assets that support generating training datasets based on intrinsic-parameter variation and extrinsic-parameter variation, where intrinsic-parameter variation and extrinsic-parameter variation provide programmable machine-learning data representations of assets and scenes. Additional specific functionality is provided using components of the SDaaS as described in more detail below.

Accordingly, one example embodiment of the present invention provides a distributed computing system asset assembly engine. The asset assembly engine is configured to receive a first source asset from a first distributed Synthetic Data as a Service (SDaaS) upload interface. The engine is also configured to receive a second source asset from a second a distributed SDaaS upload interface. The engine is also configured to ingest the first source asset and the second source asset. Ingesting a source asset comprises automatically computing values for asset-variation parameters of the source asset. The asset-variation parameters are programmable for machine-learning. The engine is also configured to generate a first synthetic data asset comprising a first set of values for the asset-variation parameters. The engine is also configured to generate a second synthetic data asset comprising a second set of values for the asset-variation parameters. The engine is also configured to store the first synthetic data asset and the second synthetic data asset in a synthetic data asset store.

Accordingly, one example embodiment of the present invention provides a distributed computing system scene assembly engine. The scene assembly engine is configured to receive a selection of a first synthetic data asset and a selection of a second synthetic data asset from a distributed synthetic data as a service (SDaaS) integrated development environment (IDE). A synthetic data asset is associated with asset-variation parameters and scene-variation parameters. The asset-variation parameters and scene-variation parameters are programmable for machine-learning. The engine is also configured to receive values for generating a synthetic data scene. The values correspond to asset-variation parameters or scene-variation parameters. The engine is also configured to, based on the values, generate the synthetic data scene using the first synthetic data asset and the second synthetic data asset.

Accordingly, one example embodiment of the present invention provides a distributed computing system frameset assembly engine. The frameset assembly engine is configured to access a synthetic data scene. The engine is also configured to determine a first set of values for scene-variation parameters. The first set of values are automatically determined for generating a synthetic data scene frameset. The engine is also configured to generate the synthetic data scene frameset based on the first set of values. The synthetic data scene frameset comprises at least a first frame in the frameset comprising the synthetic data scene updated based on a value for a scene-variation parameter. The engine is also configured to store the synthetic data scene frameset.

Accordingly, one example embodiment of the present invention provides a distributed computing system frameset package generator. The frameset package generator is configured to access a frameset package generator profile. The frameset package generator profile is associated with a first image generation device. The frameset package generator profile comprises known device-variability parameters associated with the first image generation device. The engine is also configured to generate a frameset package based on the frameset package generator profile. The frameset package generator profile comprises values for the known device-variability parameters. The engine is also configured to store the frameset package.

Accordingly, one example embodiment of the present invention provides a distributed computing system frameset package store. The frameset package store is configured to receive, from a frameset package query interface, a query for a frameset package. The frameset query interface comprises a plurality of frameset package categories. The engine is also configured to identify a query result frameset package based on a frameset package profile. The engine is also configured to communicate the query result frameset package.

Accordingly, one example embodiment of the present invention provides a distributed computing system feedback loop engine. The feedback loop engine is configured to access a training dataset report. The training dataset report identifies a synthetic data asset having values for asset-variation parameters. The synthetic data asset is associated with a frameset. The engine is also configured to, based on the training dataset report, update the synthetic data asset with a synthetic data asset variation. The engine is also configured to update the frameset using the updated synthetic data asset.

Accordingly, one example embodiment of the present invention provides a distributed computing system crowdsourcing engine. The crowdsourcing engine is configured to receive a source asset from a distributed synthetic data as a service (SDaaS) crowdsource interface. The engine is also configured to receive a crowdsource tag for the source asset via the distributed SDaaS crowdsource interface. The engine is also configured to, based in part on the crowdsource tag, ingest the source asset. Ingesting the source asset comprises automatically computing values for asset-variation parameters of the source. The asset-variation parameters are programmable for machine-learning. The engine is also configured to generate a crowdsourced synthetic data asset comprising the values for asset-variation parameters.

As such, the embodiments described herein improve computing functions and operations for generating training datasets based on implement providing synthetic data as a service using a distributed computing system. For example, the computing operations required for manual development (e.g., labeling and tagging) and refinement (e.g., searching) of training datasets is obviated based on SDaaS operations that automatically develop training datasets using synthetic data assets and automatically refine training datasets based on training dataset reports indicating additional synthetic data assets or scenes that would improve a machine-learning model in a machine-learning training service. In this regard, the SDaaS addresses the specific problem of manual development of machine-learning training datasets and improves on existing processes for training machine-learning models in a distributed computing system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 5 is a schematic diagram illustrating an example distributed computing system synthetic data as a service interface, in accordance with embodiments of the present invention;

DETAILED DESCRIPTION

Figure 1A:
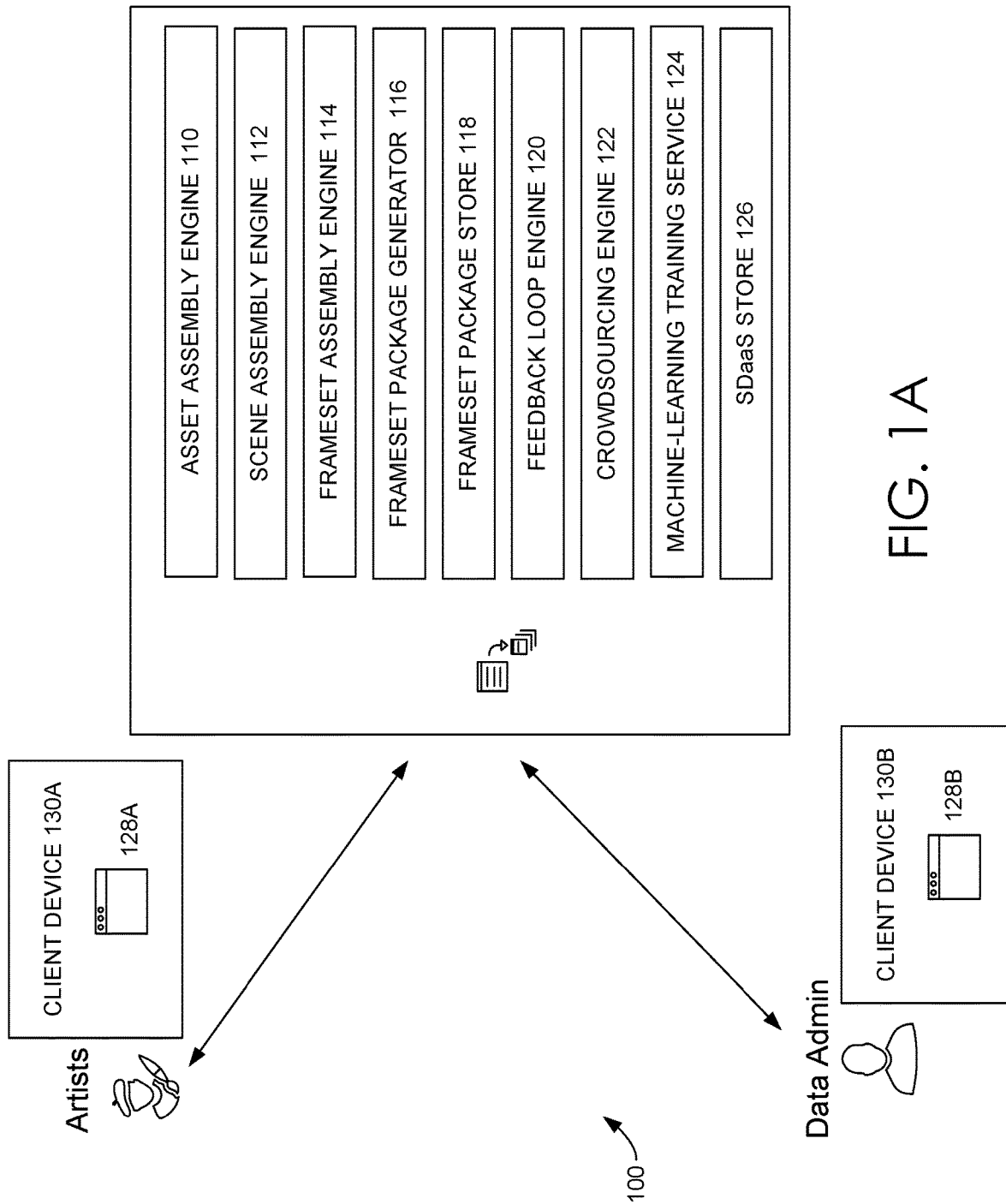
FIGS. 1A and 1B are block diagrams of an example distributed computing for providing synthetic data as a service, in accordance with embodiments of the present invention.

Distributed computing systems can be leveraged to provide different types of service-oriented models. By way of background, a service model may offer abstraction from underlying operations associated with providing the corresponding service. Examples of service models include Infrastructure as a Service, Platform as a Service, Software as a Service, and Function as a Service. With any of these models, customers develop, run, manage, aspects of the service without having to maintain or develop operational features that are abstracted using the service-oriented architecture.

Machine-learning that uses statistical techniques to give computers the ability progressively improve performance of a specific task with data, without being explicitly programmed. For example, machine learning can be used for data security, personal security, fraud detection, healthcare, natural language processing, online searching and recommendations, financial trading and smart cars. For each of these fields or domains, machine learning models are trained with training datasets that are example sets of data used to create the framework for matching learning tasks and machine learning applications. Training datasets are an integral part of the field of machine learning. High-quality datasets can help improve machine learning algorithms and computing operations associated with machine learning hardware and software. Machine learning platforms operate based on training datasets that support supervised and semi-supervised machine learning algorithms; however high-quality training datasets are usually difficult and expensive to produce because the large amount of time needed to label the data. Machine learning models depend on high-quality labeled training dataset for supervised learning such that the model can provide reliable results in predictions, classification, and analysis of different types of phenomena. Without the right type of training dataset, developing a reliable machine learning model may be impossible. A training dataset includes labeled, tagged and annotated entries to train the machine-learning algorithm effectively.

Conventional methods for finding training datasets fall significantly short when it comes to democratizing or making training datasets universally available for use across several different domains. Currently such limited solutions include outsourcing the labeling functions, repurposing existing training data and labels, harvesting your own training data and labels from free sources, relying on third-party models that have been pre-trained on labeled data, and leveraging crowdsourcing labeling services. Most of these solutions are either time consuming, expensive, inappropriate for sensitive projects, or plainly not robust enough to tackle large scale machine-learning projects. Moreover, theoretical solutions for developing machine-learning training datasets simply have not been fully defined or described because the infrastructure for implementing such solutions is inaccessible or far too expensive to undertake to realize alternatives to current techniques for developing training datasets. Overall, comprehensive functionality around developing machine-learning training datasets is limited in conventional machine-learning training services.

Embodiments described herein provide simple and efficient methods and systems for implementing a distributed computing system that provides synthetic data as service ("SDaaS"). SDaaS may refer to a distributed (cloud) computing system service that is implemented using a service-oriented architecture to provide machine-learning training services while abstracting underlying operations that are managed via the SDaaS service. For example, the SDaaS provides a machine-learning training system that allows customers to configure, generate, access, manage and process synthetic data training datasets for machine-learning. In particular, the SDaaS operates without the complexity typically associated with manual development of training datasets. SDaaS can be delivered in a number ways based on SDaaS engines, managers, modules or components, which include asset assembly engine, scene assembly engine, frameset assembly engine, frameset package generator, frameset package store, feedback loop engine, and crowdsourcing engine. The observable effect of implementing the SDaaS on a distributed computing system is the mass production and availability of synthetic data assets that support generating training datasets based on intrinsic-parameter variation and extrinsic-parameter variation, where intrinsic-parameter variation and extrinsic-parameter variation provide programmable machine-learning data representations of assets and scenes. Additional specific functionality is provided using components of the SDaaS as described in more detail below.

It is contemplated herein that a source asset may include several different parameters that may be computationally determined based on known techniques in the art. By way of example, a source asset may refer to a three-dimensional representation of geometric data. The source asset may be expressed as a mesh made of triangles, where the smoother the triangles and the more detailed the surface of the model is, the bigger the size of the source. In this regard, a source asset can be represented across a spectrum from a high polygon model with lots of detail to a low polygon model with less detail. The process of representing a source asset in varying levels of detail may be referred to as decimation. A low polygon model can be used in different types of processes that would otherwise be computationally expensive for a high model. As such, an automated decimation process may be implemented to store a source asset in different levels of detail. Other types of programmable parameters may be determined and associated with a source asset that is stored as a synthetic asset.

Embodiments of the present invention operate on a two-tier programmable parameter system where a machine-learning training service may automatically or based on manual intervention train a model based on accessing and determining first-tier (e.g., asset parameter) and/or a second tier (e.g., scene or frameset parameter) parameters that are needed to improve a training dataset and by extension model training. A machine-learning training service may support deep learning and a deep learning network and other types of machine learning algorithms and networks. The machine-learning training service may also implement a generative adversarial network as a type of unsupervised machine learning. The SDaaS may leverage these underlying tiered parameters in different ways. For example, how much to charge for framesets, how to develop different types of framesets for specific devices knowing the device parameters and being able to manipulate the parameters in developing training datasets.

Example Operating Environment and Schematic Illustrations

Figure 1B:
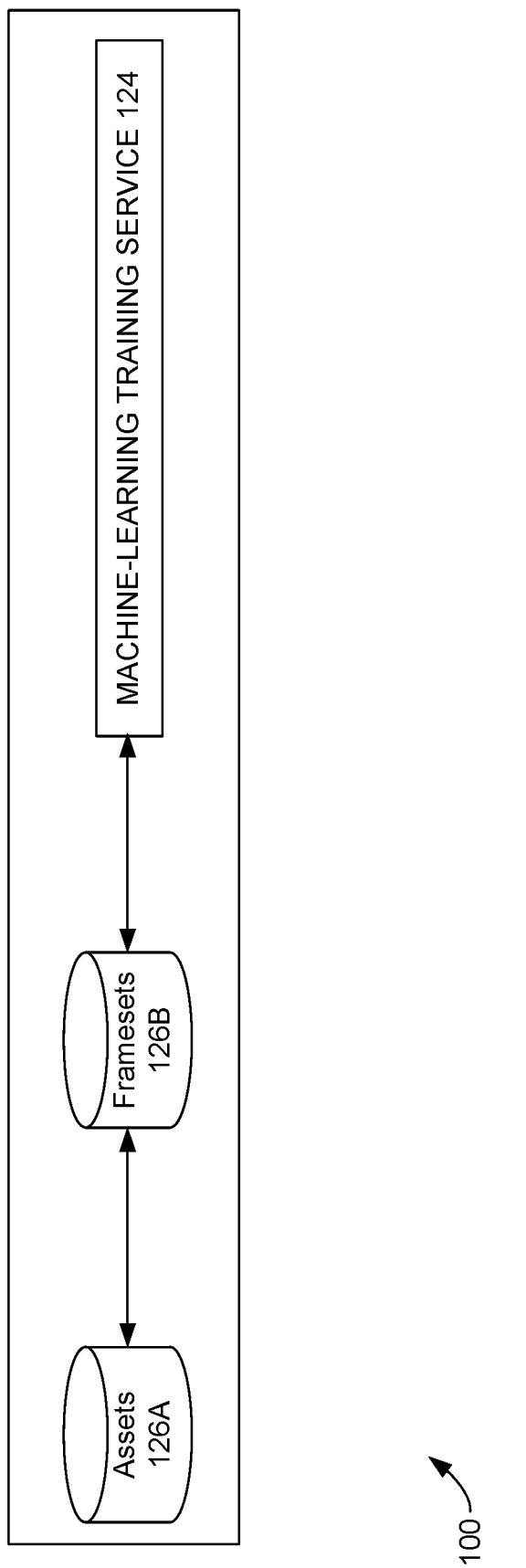

With reference to FIG. 1A and FIG. 1B, the components of the distributed computing system 100 may operate together to provide functionality for the SDaaS described herein. The distributed computing system 100 supports processing synthetic data assets for generating and processing training datasets for machine-learning. At a high level, the distributed computing supports a distributed framework for mass production of training datasets. In particular, a distributed computing architecture built on features include file compression, GPU enabled hardware at scale, unstructured storage, a distributed backbone network, inherently support the capacity to provide the SDaaS functionality in a distributed manner such that a plurality of user (e.g., artists or data admins) may simultaneously access an operate on synthetic data assets.

FIG. 1A includes client device 130A and interface 128A and client device 130B and interface 128B. The distributed computing system further includes several components that support the functionality of the SDaaS, the components include asset assembly engine 110, scene assembly engine 112, frameset assembly engine 114, frameset package generator 116, frameset package store 118, feedback loop engine 120, crowdsourcing engine 122, machine-learning training service 124, and SDaaS store 126. FIG. 1B illustrates assets 126A and framesets 126B stored in SDaaS store 126 and integrated with a machine-learning training service for automated access to assets, scenes, and framesets as described in more detail below.

Figure 2A:
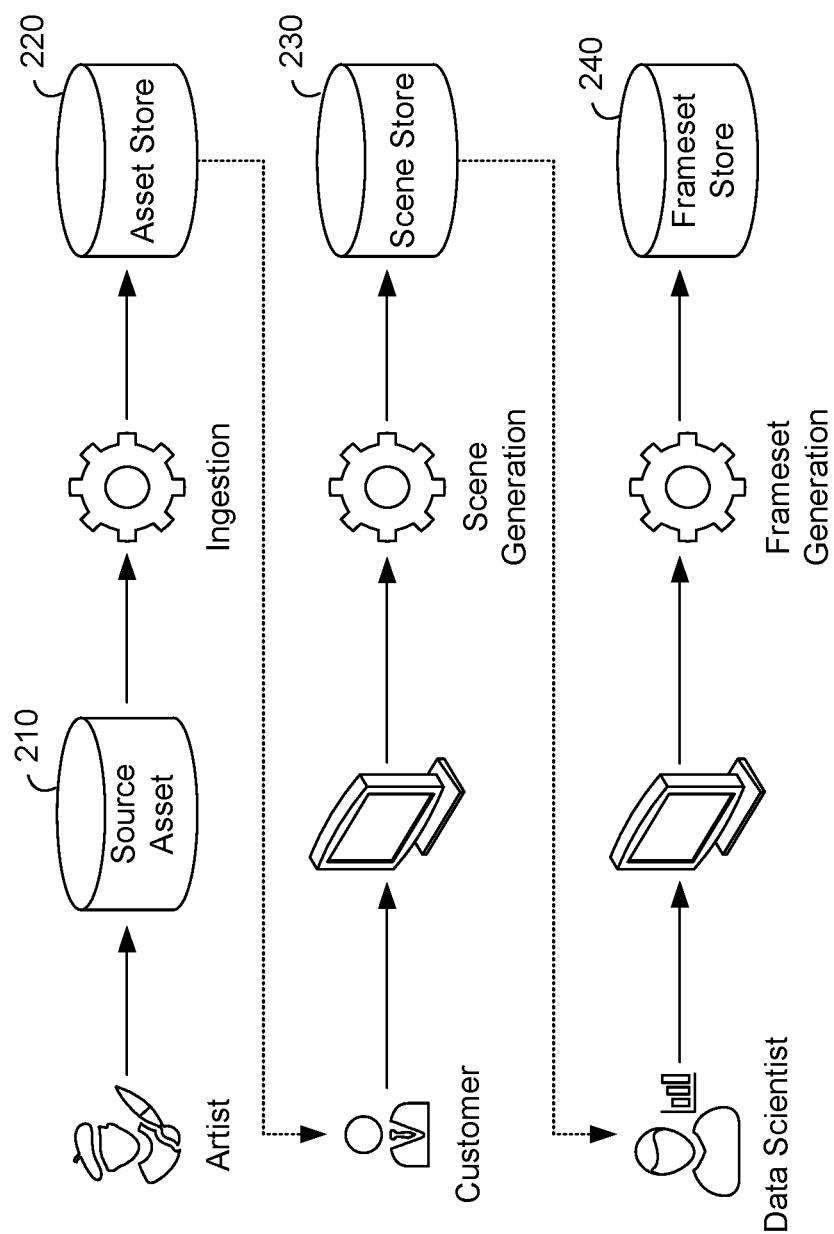
FIGS. 2A and 2B are flow diagrams illustrating an example implementation of a distributed computing system synthetic data as a service, in accordance with embodiments of the present invention.

The asset assembly engine 110 may be configured to receive a first source asset from a first distributed Synthetic Data as a Service (SDaaS) upload interface and may receive a second source asset from a second a distributed SDaaS upload interface. The first source asset and the second source asset may be ingested where ingesting a source asset comprises automatically computing values for asset-variation parameters of the source asset. For example, FIG. 2A includes source asset 210 ingested into an asset store (i.e., asset 220). The asset-variation parameters are programmable for machine-learning. The asset assembly engine may generate a first synthetic data asset comprising a first set of values for the asset-variation parameters and may generate a second synthetic data asset comprising a second set of values for the asset-variation parameters. The first synthetic data asset and the second synthetic data asset are stored synthetic data asset store.

The distributed SDaaS upload interface (e.g., interface 128A or 128B) is associated with an SDaaS integrated development environment (IDE). The SDaaS IDE supports identifying additional values for asset-variation parameters for source assets. The values are associated with generating training datasets based on intrinsic-parameter variation and extrinsic-parameter variation, where intrinsic-parameter variation and extrinsic-parameter variation provide programmable machine-learning data representations of assets and scenes. Ingesting source assets is based on a machine-learning synthetic data standard comprising a file format and a dataset-training architecture. File format may refer to hard standards while the dataset-training architecture may refer to soft standards, for example, automated or manual human intervention.

Figure 2B:
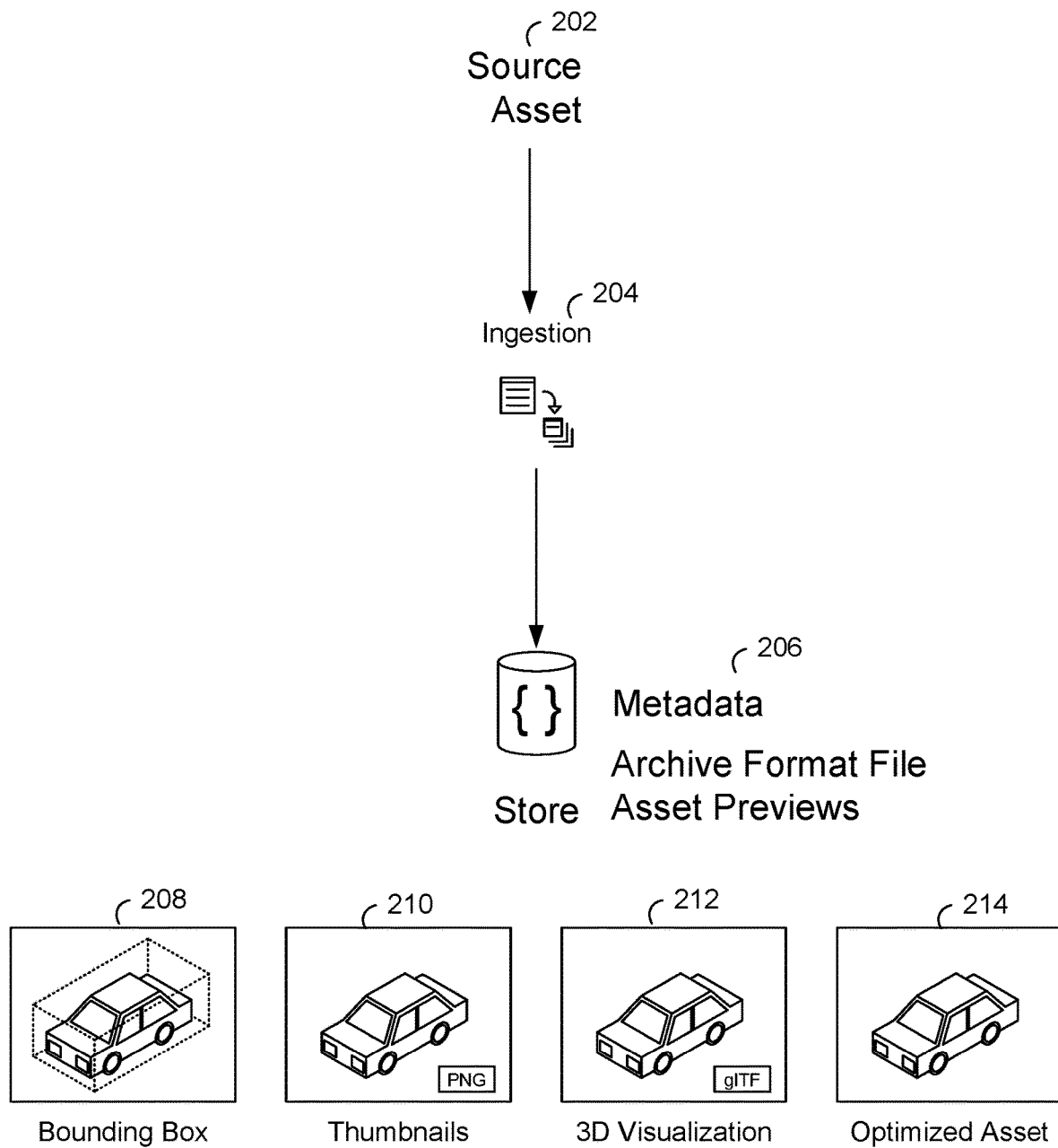
Figure 3:
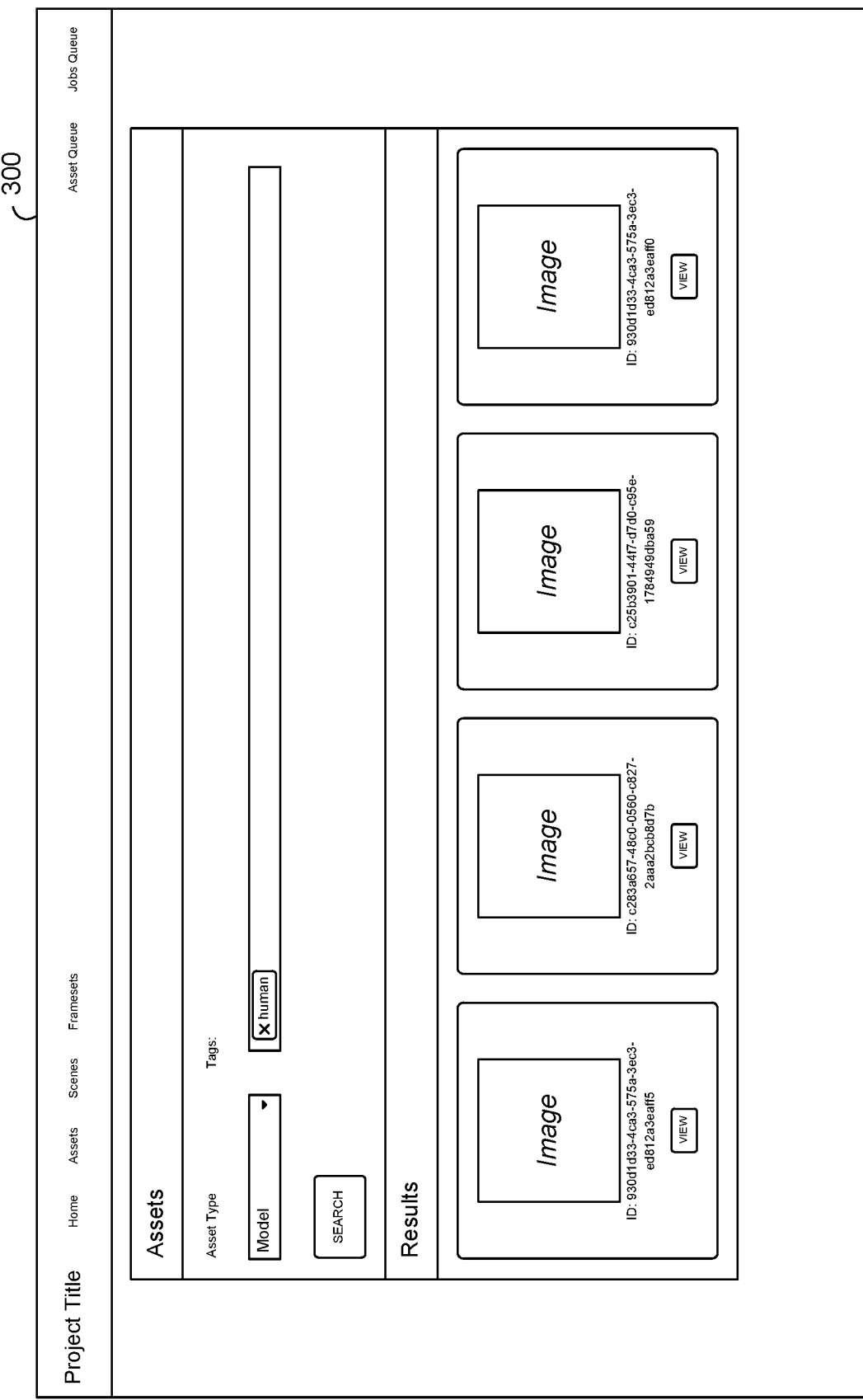
FIG. 3 is a schematic diagram illustrating an example distributed computing system synthetic data as a service interface, in accordance with embodiments of the present invention.

With reference to FIG. 2, ingesting the source asset (e.g., source asset 202) comprises further comprises automatically computing values for scene-variation parameters of the source asset, where the scene-variation parameters are programmable for machine-learning. A synthetic data asset profile may be generated, where the synthetic data asset profile comprises the values of the asset-variation parameters. FIG. 2 further illustrates additional artifacts such as bounding box 208, thumbnail 210, 3D visualization 212, and an optimized asset 214.

Figure 4:
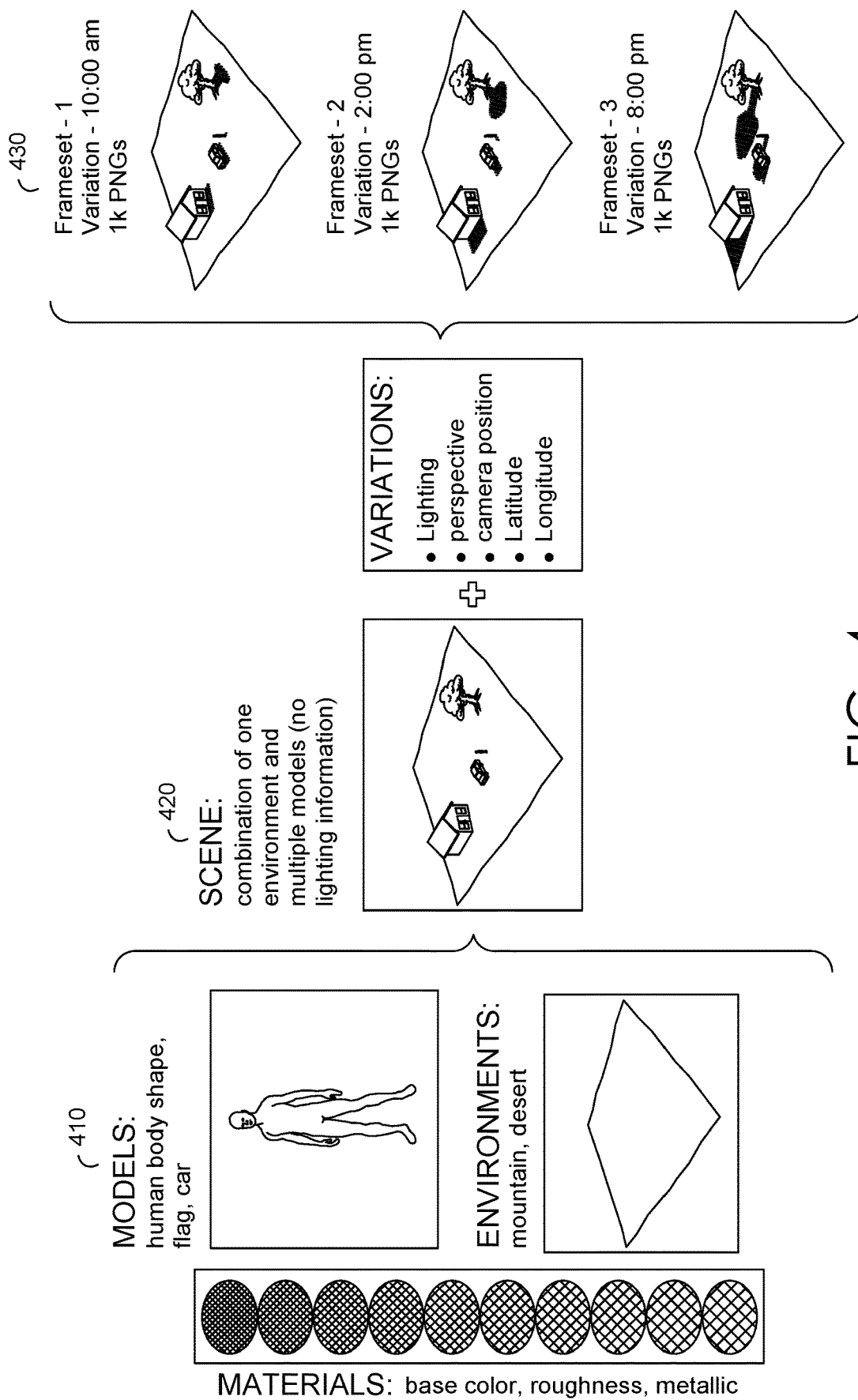
FIG. 4 is a schematic diagram illustrating an example distributed computing system synthetic data as a service workflow, in accordance with embodiments of the present invention.

The scene assembly engine 112 may be configured to receive a selection of a first synthetic data asset and a selection of a second synthetic data asset from a distributed synthetic data as a service (SDaaS) integrated development environment (IDE). For example, with reference to FIG. 4, assets and parameters 410 at a first tier may be used to generate a scene and parameters 420 at a second tier and further used to define framesets 430. The synthetic data asset is associated with asset-variation parameters and scene-variation parameters. The asset-variation parameters and scene-variation parameters are programmable for machine-learning. The scene assembly engine may receive values for generating a synthetic data scene, where the values correspond to asset-variation parameters or scene-variation parameters. Based on the values, generate the synthetic data scene using the first synthetic data asset and the second synthetic data asset.

A scene assembly engine client (e.g., client device 130B) may be configured to receive a query for a synthetic data asset, wherein the query is received via the SDaaS IDE and generate a query result synthetic data asset; and cause display of the synthetic data scene generated based on the query result synthetic data. Generating the synthetic data scene may be based on values for scene generation received from at least two scene assembly engine clients. The synthetic data scene in association with a scene preview and metadata.

The frameset assembly engine 114 may be configured to access a synthetic data scene and determine a first set of values for scene-variation parameters, wherein the first set of values are automatically determined for generating a synthetic data scene frameset. The frameset assembly engine may also generate the synthetic data scene frameset based on the first set of values, where the synthetic data scene frameset comprises at least a first frame in the frameset comprising the synthetic data scene updated based on a value for a scene-variation parameter; and store the synthetic data scene frameset. A second set of values for scene-variation parameters are manually selected for generating the synthetic data scene frameset. The second set of values are manually selected using a synthetic data as a service (SDaaS) integrated development environment (IDE) that supports a machine-learning synthetic data standard comprising a file format and a dataset-training architecture. Generating the synthetic data scene frameset comprises iteratively generating frames for the synthetic data scene frameset based on updating the synthetic data scene based on the first set of values.

A frameset package generator 116 may be configured to access a frameset package generator profile, where the frameset package generator profile is associated with a first image generation device, where the frameset package generator profile comprises known device-variability parameters associated with the first image generation device. A frameset package is based on the frameset package generator profile, where the frameset package generator profiles comprises values for the known device-variability parameters; and store the frameset package. The frameset package comprises a category that is based on the least two synthetic data scenes. Generating a frameset package is based on an anticipated machine learning algorithm that will be trained with the frameset package, where the anticipated machine learning algorithm is identified in the frameset package generator profile. The frameset package comprises assigning a value quantifier to the frameset package. The frameset package is generated based on synthetic data scene comprising a synthetic data asset.

The frameset package store 118 may be configured to receive, from an frameset package query interface, a query for a frameset package, where the frameset query interface comprises a plurality of frameset package categories, identify a query result frameset package based on a frameset package profile; and communicate the query result frameset package. At least a portion of the query triggers an automatically suggested frameset package, where the automatically suggested frameset is associated with synthetic data scene of the frameset, the synthetic data scene having a synthetic data asset. The frameset package is associated with an image generation device, where the image generation device comprises known device-variability parameters that are programmable for machine learning. The query result frameset package is communicated to an internal machine learning model training service (e.g. machine-learning training service 124) operating on the distributed computing system or an external machine learning model training service.

The feedback loop engine 120 may be configured to access a training dataset report, wherein the training dataset report identifies a synthetic data asset having values for asset-variation parameters, where the synthetic data asset is associated with a frameset. Based on the training dataset report, update the synthetic data asset with a synthetic data asset variation; and update the frameset using the updated synthetic data asset. The values are manually or automatically identified in the training dataset report for updating the frameset. Updating the frameset is assigned a value quantifier. The training dataset report is associated with an internal machine learning model training service operating on the distributed system or an external machine learning model training service.

Figure 5:
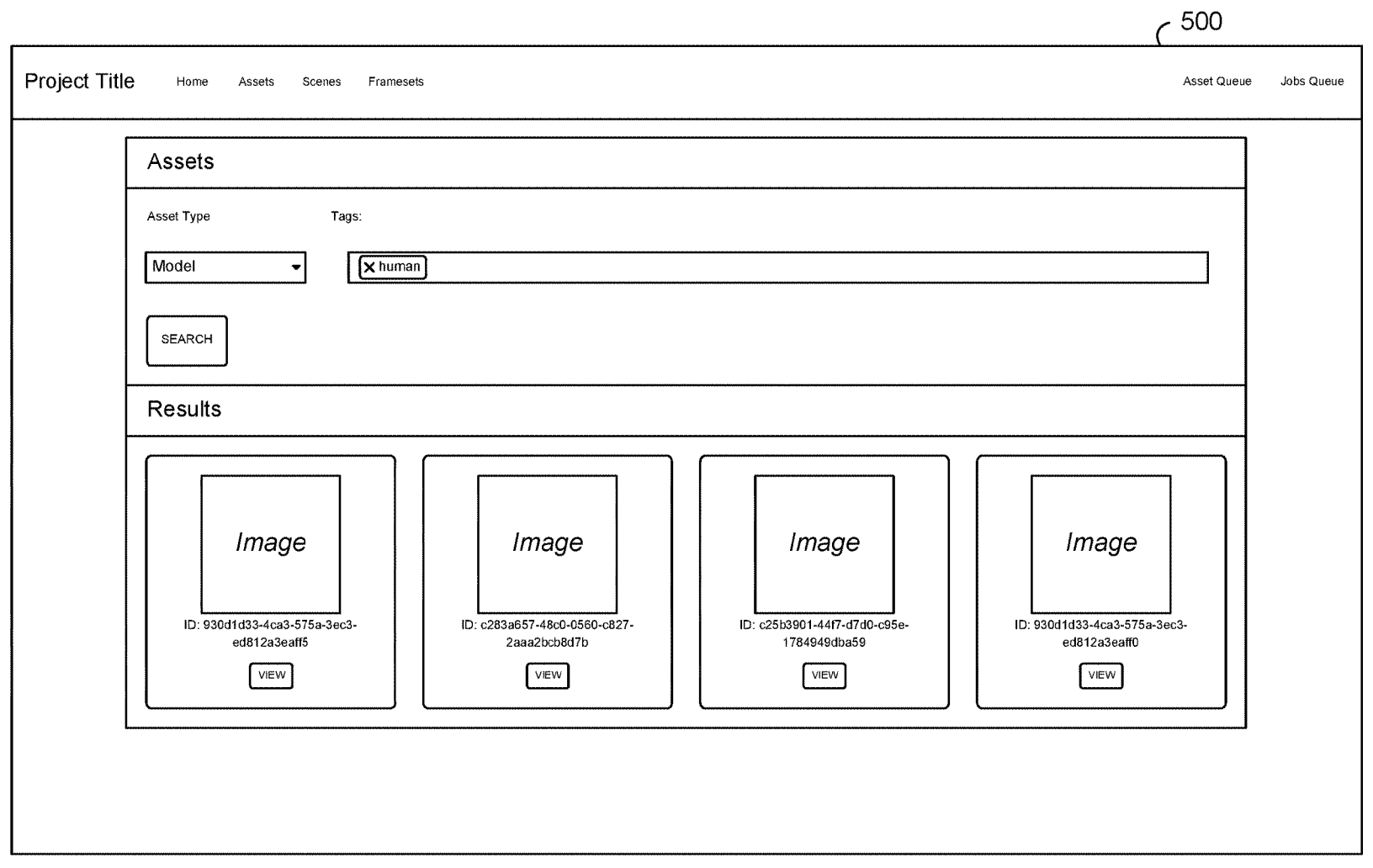

A crowdsourcing engine 122 may be configured to receive a source asset from a distributed synthetic data as a service (SDaaS) crowdsource interface; receive a crowdsource tag for the source asset via the distributed SDaaS crowdsource interface; based in part on the crowdsource tag, ingest the source asset, where ingesting the source asset comprises automatically computing values for asset-variation parameters of the source asset, wherein the asset-variation parameters are programmable for machine-learning; and generate a crowdsourced synthetic data asset comprising the values for asset-variation parameters. A value quantifier for the crowdsourced synthetic data asset. A crowdsourced synthetic data asset profile comprising asset-variation parameters. With reference to FIG. 5, crowdsource interface 500 may support uploading and tag source assets for ingestion.

Example Flow Diagrams

With reference to FIGS. 6-12 flow diagrams are provided illustrating methods for implementing distributed computing system synthetic data as a service. The methods can be performed using the distributed computing system described herein. In embodiments, one or more computer storage media having computer-executable instructions embodied thereon that, when executed, by one or more processors, can cause the one or more processors to perform the methods in the distributed computing system 100.

Figure 6:
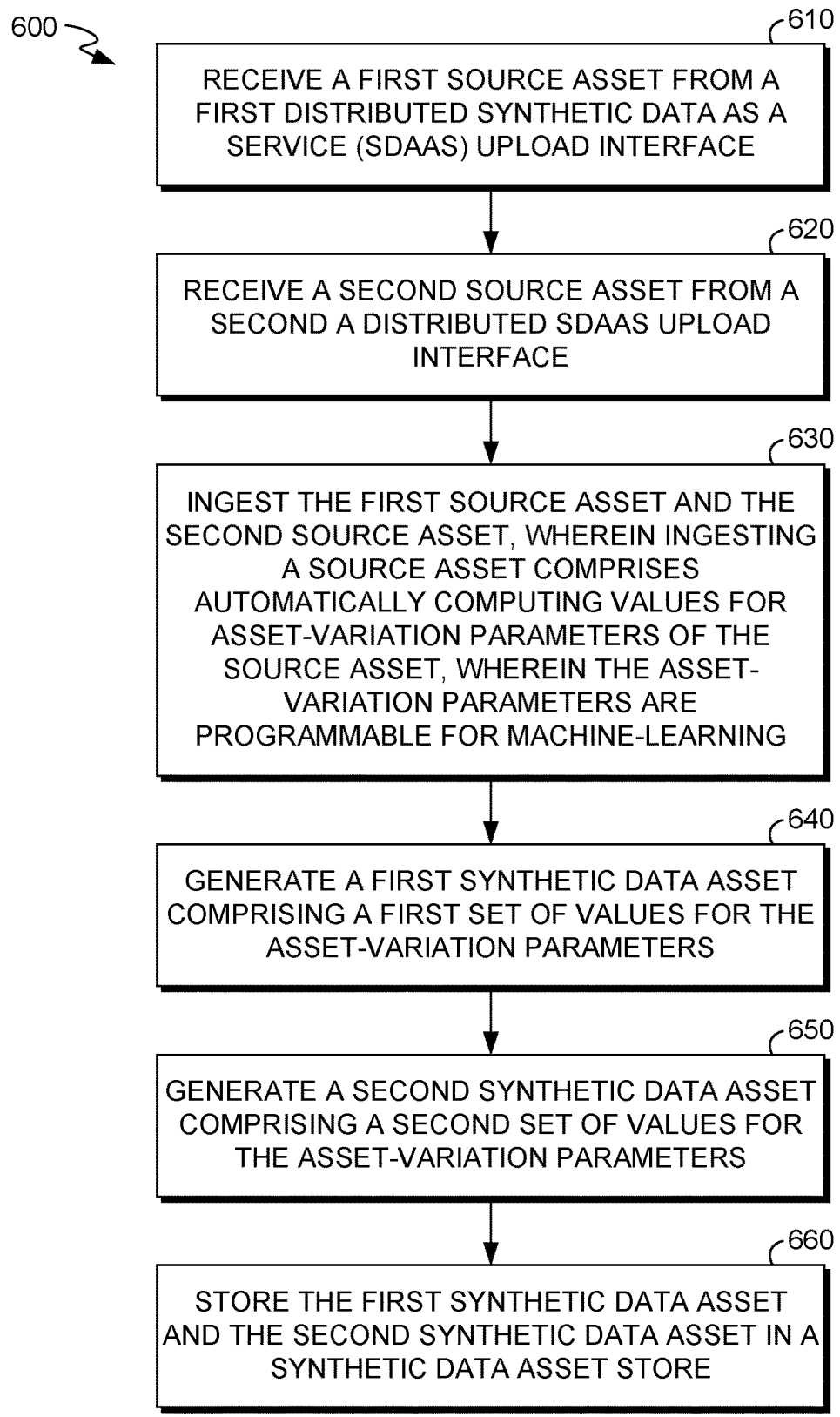
FIG. 6 is a flow diagram illustrating an example distributed computing system synthetic data as a service operation, in accordance with embodiments of the present invention.

FIG. 6 is a flow diagram illustrating a process 600 for implementing a distributed computing system asset assembly engine according to embodiments. Initially at block 610, a first source asset is received from a first distributed Synthetic Data as a Service (SDaaS) upload interface. At block 620, a second source asset is received from a second a distributed SDaaS upload interface. At block 630, the first source asset and the second source asset are ingested. Ingesting a source asset comprises automatically computing values for asset-variation parameters of the source asset, where the asset-variation parameters are programmable for machine-learning. At block 640, a first synthetic data asset comprising a first set of values for the asset-variation parameters is generated. At block 650, a second synthetic data asset comprising a second set of values for the asset-variation parameters is generated. At block 660, store the first synthetic data asset and the second synthetic data asset in a synthetic data asset store.

Figure 7:
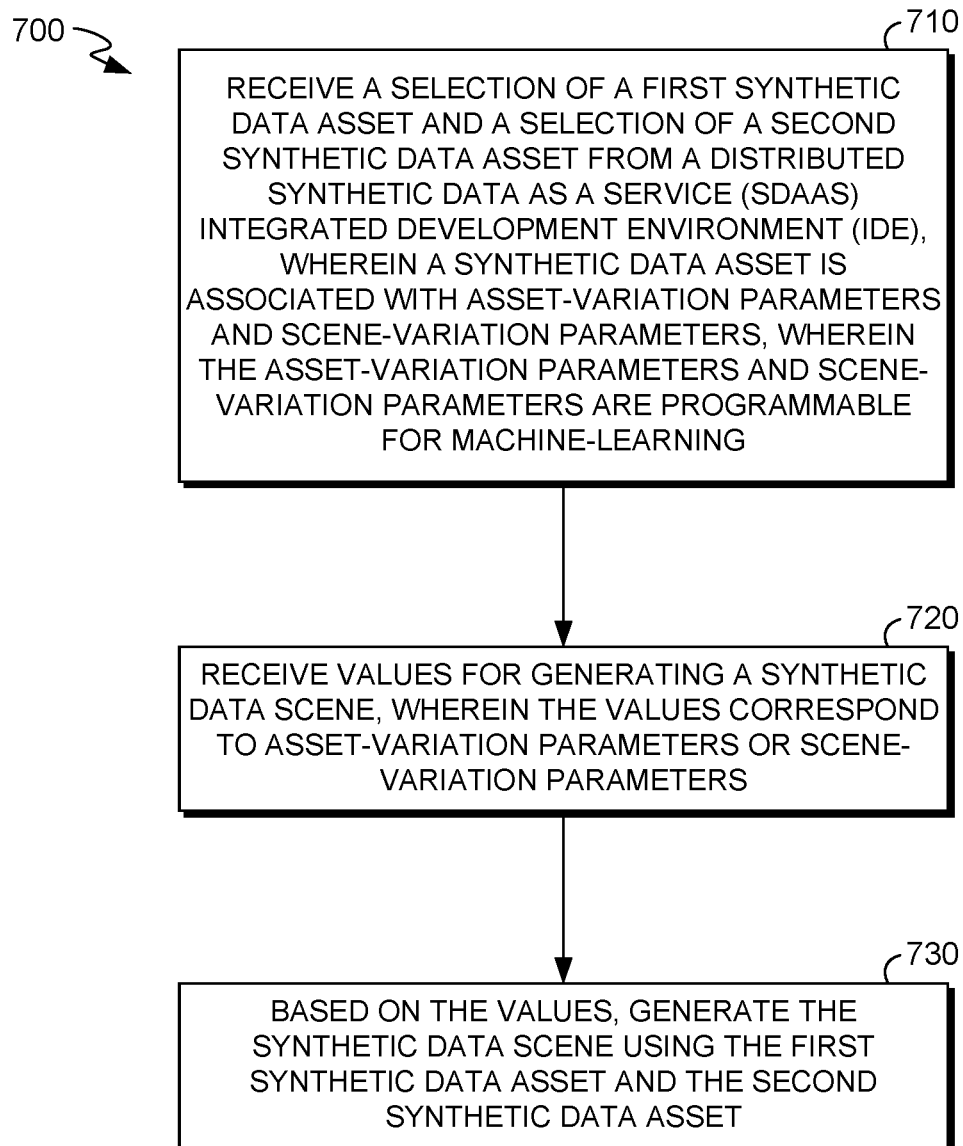
FIG. 7 is a flow diagram illustrating an example distributed computing system synthetic data as a service operation, in accordance with embodiments of the present invention.

FIG. 7 is a flow diagram illustrating a process 700 for implementing a distributed computing system scene assembly engine according to embodiments. Initially at block 710, a selection of a first synthetic data asset and a selection of a second synthetic data asset are received from a distributed synthetic data as a service (SDaaS) integrated development environment (IDE). A synthetic data asset is associated with asset-variation parameters and scene-variation parameters, the asset-variation parameters and scene-variation parameters are programmable for machine-learning. At block 720, values for generating a synthetic data scene are received. The values correspond to asset-variation parameters or scene-variation parameters. At block 730, based on the values, the synthetic data scene is generated using the first synthetic data asset and the second synthetic data asset.

Figure 8:
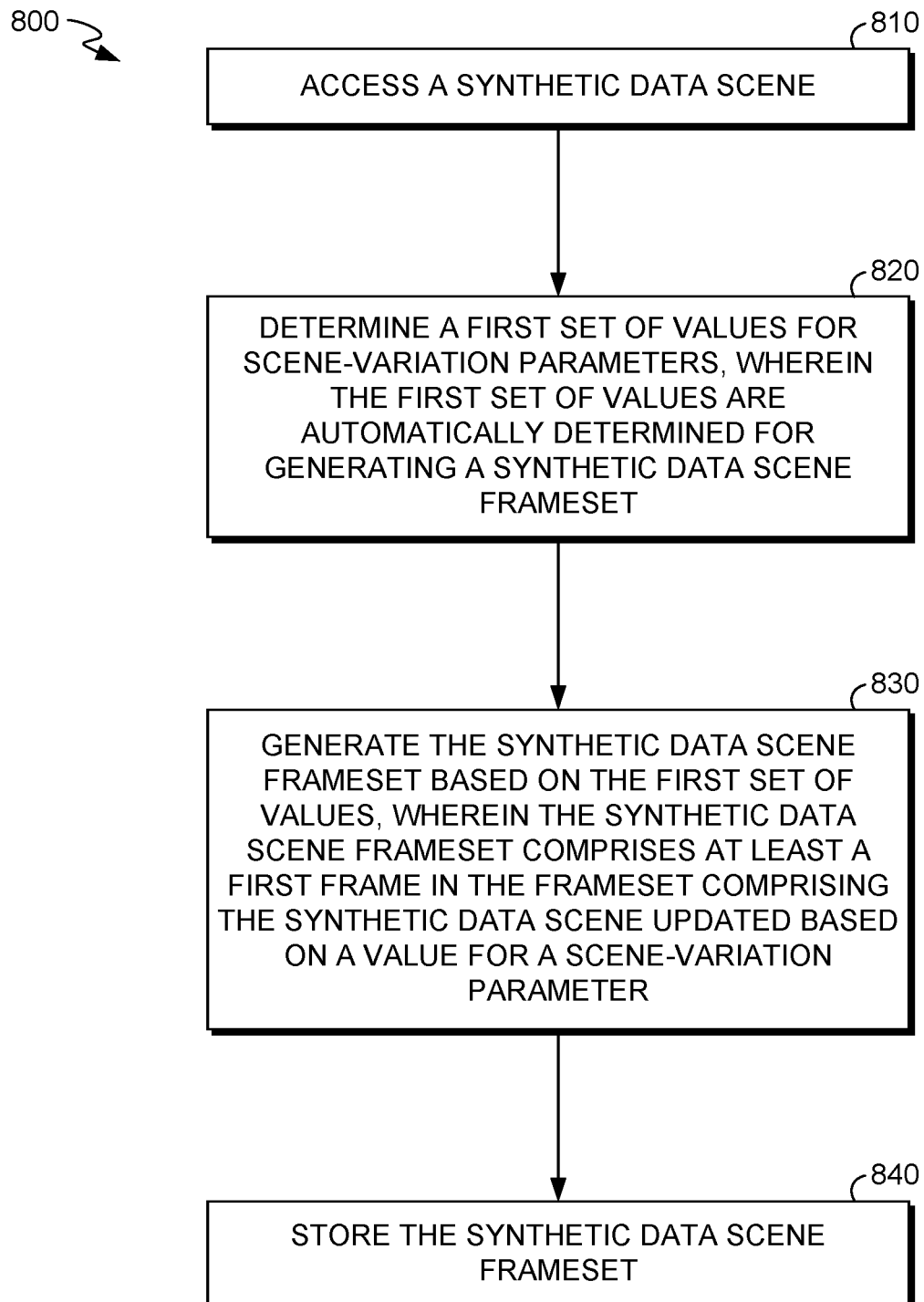
FIG. 8 is a flow diagram illustrating an example distributed computing system synthetic data as a service operation, in accordance with embodiments of the present invention.

FIG. 8 is a flow diagram illustrating a process 800 for implementing a distributed computing system frameset assembly engine according to embodiments. Initially at block 810, a synthetic data scene is accessed. At block 820, a first set of values for scene-variation parameters is determined. The first set of values are automatically determined for generating a synthetic data scene frameset. At block 830, the synthetic data scene frameset is generated based on the first set of values. The synthetic data scene frameset comprises at least a first frame in the frameset comprising the synthetic data scene updated based on a value for a scene-variation parameter. At block 840, the synthetic data scene frameset is stored.

Figure 9:
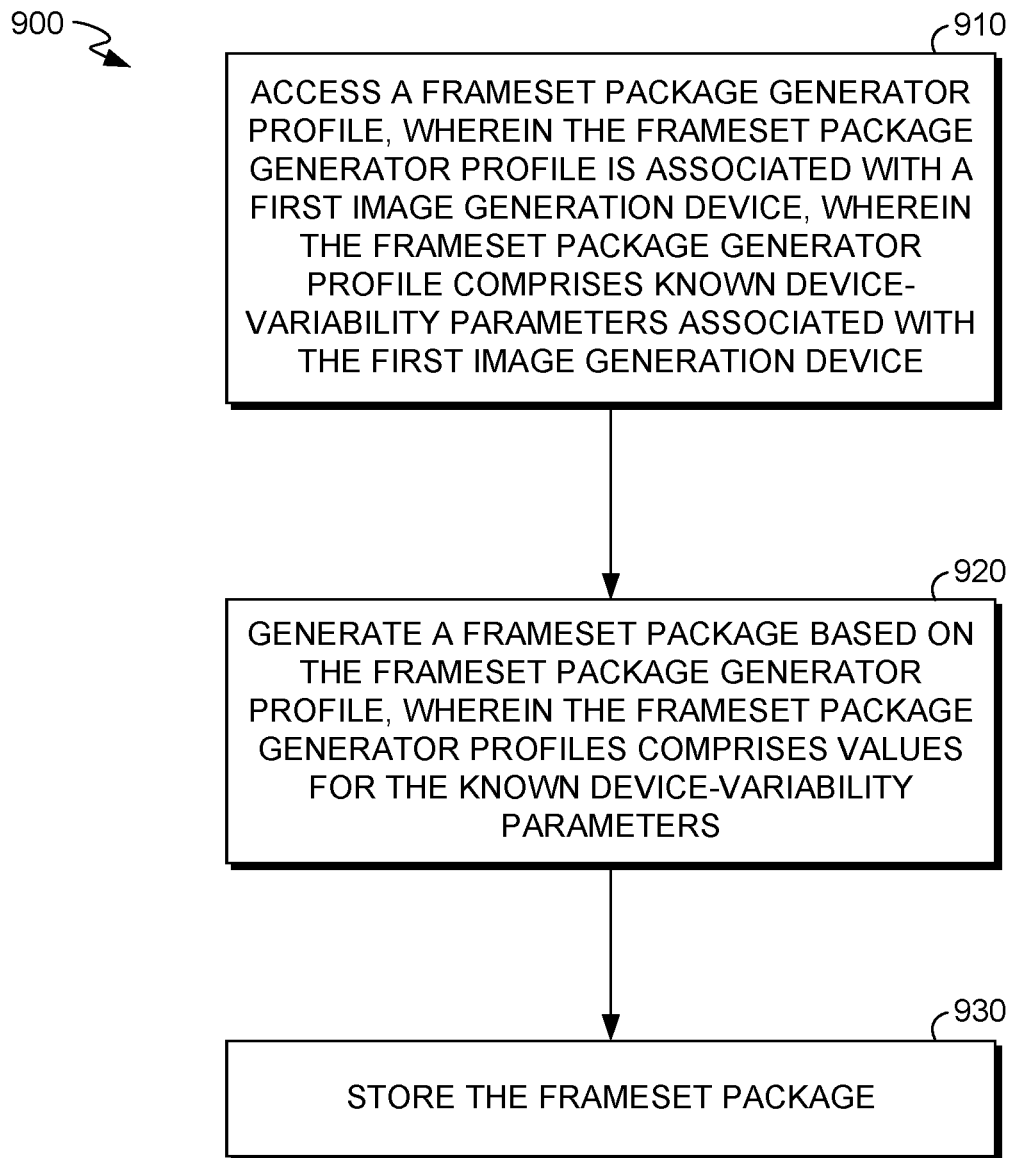
FIG. 9 is a flow diagram illustrating an example distributed computing system synthetic data as a service operation, in accordance with embodiments of the present invention.

FIG. 9 is a flow diagram illustrating a process 900 for implementing a distributed computing frameset package generator according to embodiments. At block 910, a frameset package generator profile is accessed. The frameset package generator profile is associated with a first image generation device. The frameset package generator profile comprises known device-variability parameters associated with the first image generation device. At block 920, a frameset package is generated based on the frameset package generator profile. The frameset package generator profile comprises values for the known device-variability parameters. At block 930, the frameset package is stored.

Figure 10:
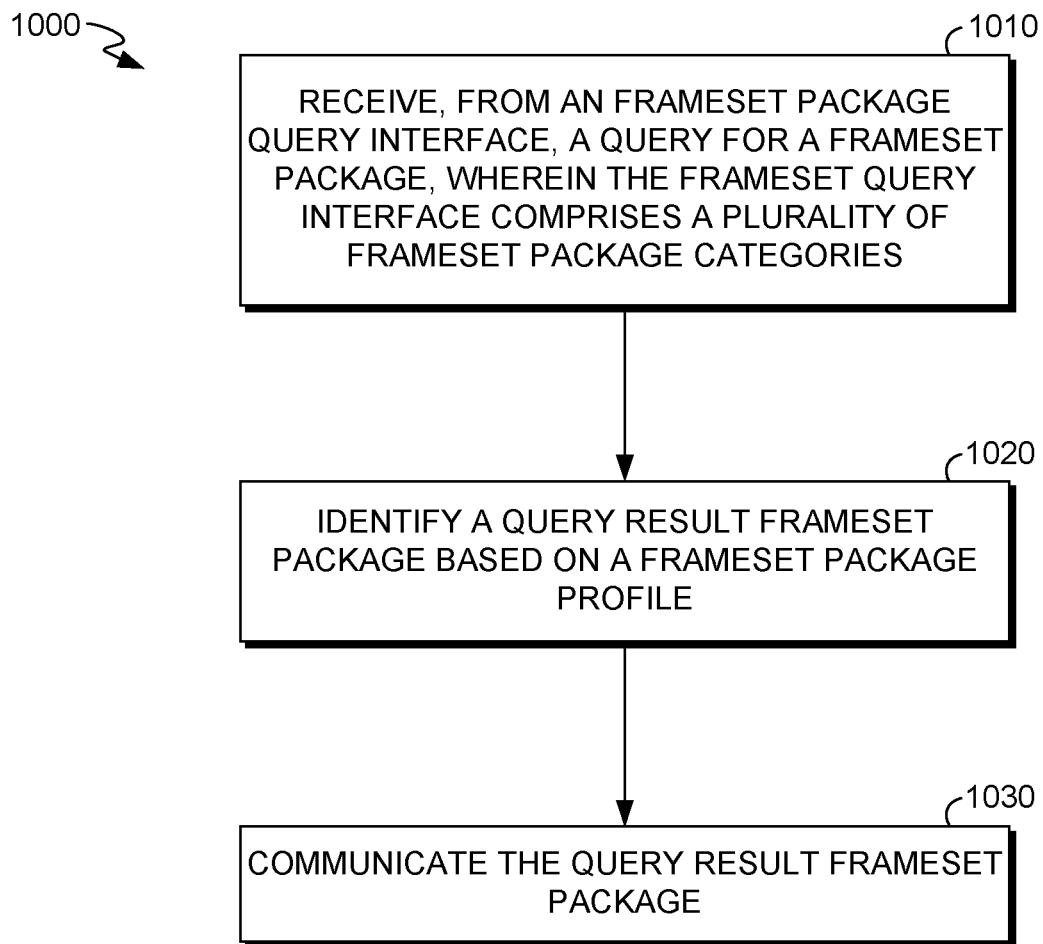
FIG. 10 is a flow diagram illustrating an example distributed computing system synthetic data as a service operation, in accordance with embodiments of the present invention.

FIG. 10 is a flow diagram illustrating a process 1000 for implementing a distributed computing system frameset package store according to embodiments. At block 1010, a query for a frameset package is received from a frameset package query interface. The frameset query interface comprises a plurality of frameset package categories. At block 1020 a query result frameset package is identified based on a frameset package profile. At block 1030, the query result frameset package is communicated.

Figure 11:
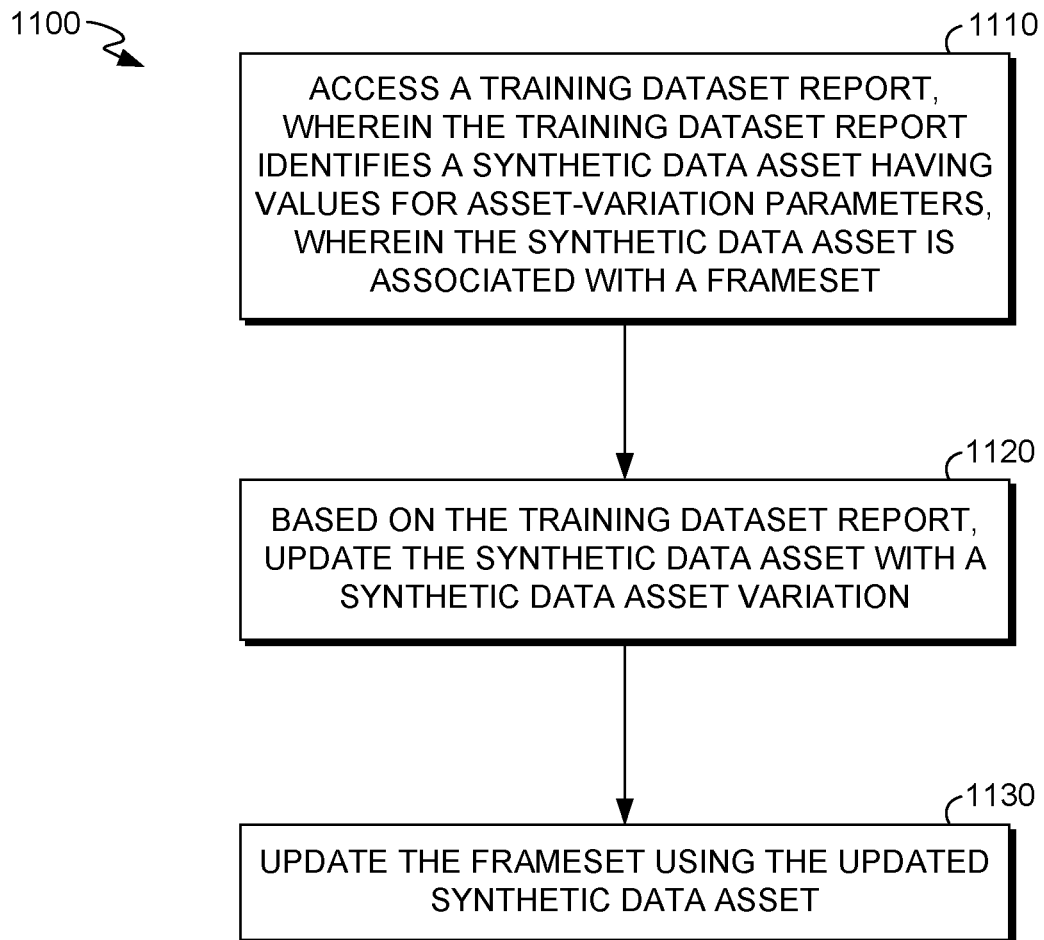
FIG. 11 is a flow diagram illustrating an example distributed computing system synthetic data as a service operation, in accordance with embodiments of the present invention.

FIG. 11 is a flow diagram illustrating a process 1100 for implementing a distributed computing system feedback loop engine according to embodiments. At block 1110, a training dataset report is accessed. The training dataset report identifies a synthetic data asset having values for asset-variation parameters. The synthetic data asset is associated with a frameset. At block 1120, based on the training dataset report, the synthetic data asset with a synthetic data asset variation is updated. At block 1130, the frameset is updated using the updated synthetic data asset.

Figure 12:
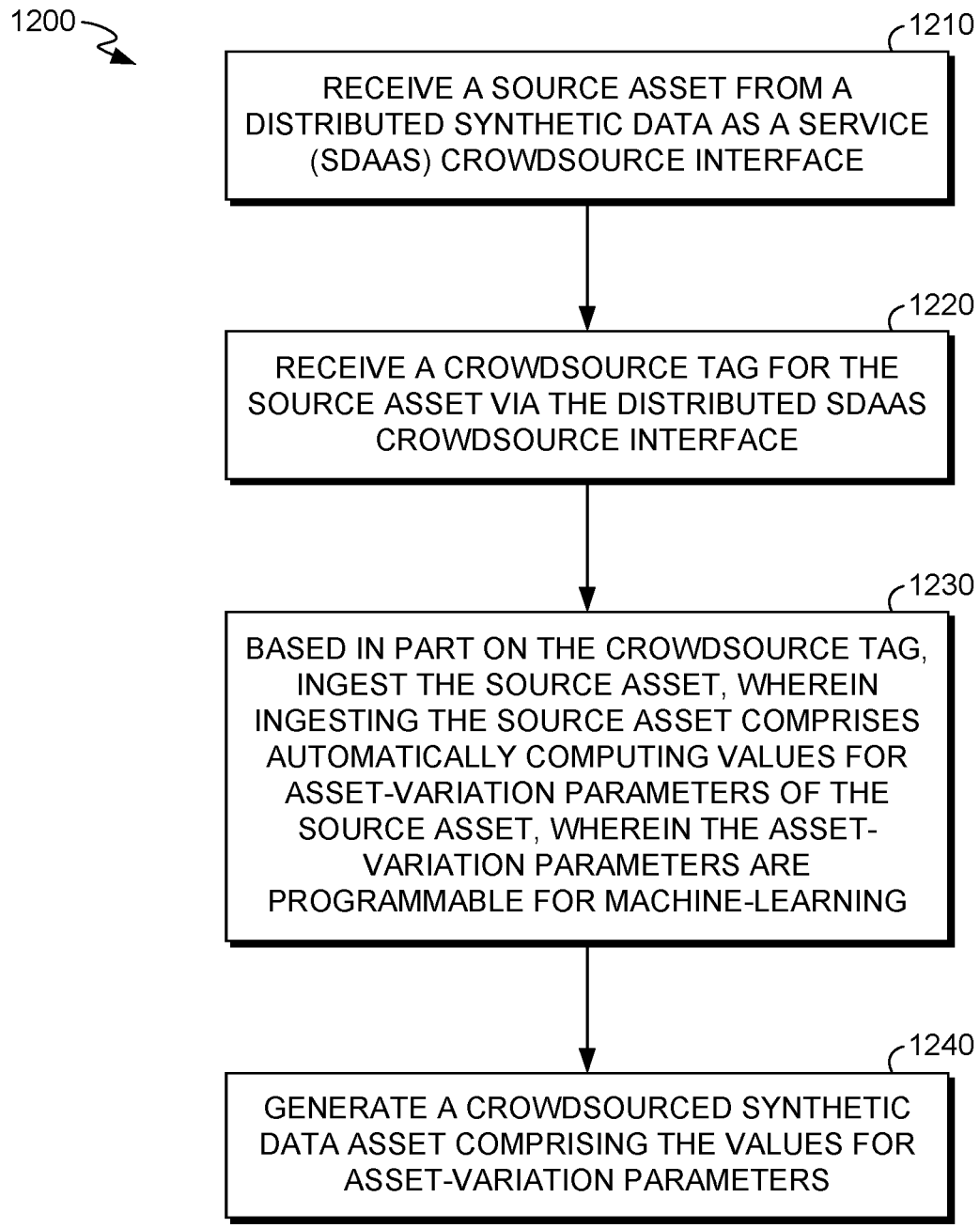
FIG. 12 is a flow diagram illustrating an example distributed computing system synthetic data as a service operation, in accordance with embodiments of the present invention.

FIG. 12 is a flow diagram illustrating a process 1200 for implementing a distributed computing system crowdsourcing engine according to embodiments. At block 1210, a source asset is received from a distributed synthetic data as a service (SDaaS) crowdsource interface. At block 1220, a crowdsource tag is received for the source asset via the distributed SDaaS crowdsource interface. At block 1230, based in part on the crowdsource tag, the source asset is ingested. Ingesting the source asset comprises automatically computing values for asset-variation parameters of the source asset. The asset-variation parameters are programmable for machine-learning. At block 1240, a crowdsourced synthetic data asset comprising the values for asset-variation parameters is generated.

Advantageously, embodiments described herein improve computing functions and operations for generating training datasets based on implement providing synthetic data as a service using a distributed computing system. In particular, the improvement to computing functions and operations is associated with a distributed infrastructure for mass production of training dataset based on SDaaS operations. For example, the computing operations required for manual development (e.g., labeling and tagging) and refinement (e.g., searching) of training datasets is obviated based on SDaaS operations that automatically develop training datasets using synthetic data assets and automatically refine training datasets based on training dataset reports indicating additional synthetic data assets or scenes that would improve a machine-learning model in a machine-learning training service.

Moreover, the storage and retrieval of training datasets is improved using an internal machine-learning training service that operates in the same distributed computing system thus alleviating computation overhead. The SDaaS operations are implemented based on an unconventional arrangement of engines and a set of defined unconventional rules for an ordered combination of steps of the SDaaS system. In this regard, the SDaaS addresses the specific problem of manual development of machine-learning training datasets and improves on existing processes for training machine-learning models in a distributed computing system. Overall, these improvements also result in less CPU computation, smaller memory requirements, and increased flexibility in generating and utilizing machine-learning training datasets.

Example Distributed Computing Environment

Figure 13:
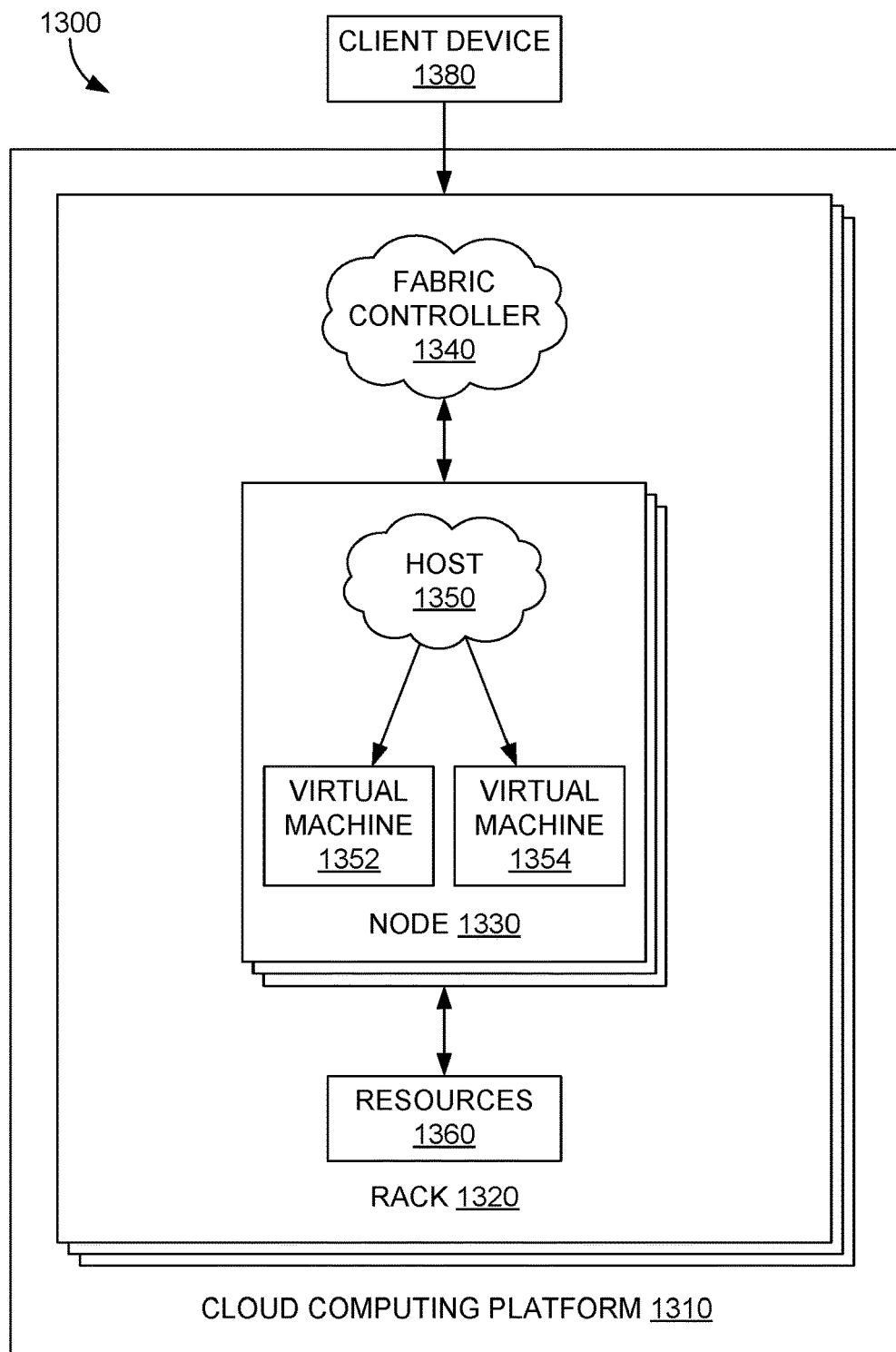
FIG. 13 is a block diagram of an example distributed computing environment suitable for use in implementing embodiments of the present invention.

Referring now to FIG. 13, FIG. 13 illustrates an example distributed computing environment 1300 in which implementations of the present disclosure may be employed. In particular, FIG. 13 shows a high level architecture of the distributed computing system synthetic data as a service in cloud computing platform 1310, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 1300 that includes cloud computing platform 1310, rack 1320, and node 1330 (e.g., computing devices, processing units, or blades) in rack 1320. The system can be implemented with cloud computing platform 1310 that runs cloud services across different data centers and geographic regions. Cloud computing platform 1310 can implement fabric controller 1340 component for provisioning and managing resource allocation, deployment, upgrade, and management of cloud services. Typically, cloud computing platform 1310 acts to store data or run service applications in a distributed manner. Cloud computing infrastructure 1310 in a data center can be configured to host and support operation of endpoints of a particular service application. Cloud computing infrastructure 1310 may be a public cloud, a private cloud, or a dedicated cloud.

Node 1330 can be provisioned with host 1350 (e.g., operating system or runtime environment) running a defined software stack on node 1330. Node 1330 can also be configured to perform specialized functionality (e.g., compute nodes or storage nodes) within cloud computing platform 1310. Node 1330 is allocated to run one or more portions of a service application of a tenant. A tenant can refer to a customer utilizing resources of cloud computing platform 1310. Service application components of cloud computing platform 1310 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1330, nodes 1330 may be partitioned into virtual machines (e.g., virtual machine 1352 and virtual machine 1354). Physical machines can also concurrently run separate service applications. The virtual machines or physical machines can be configured as individualized computing environments that are supported by resources 1360 (e.g., hardware resources and software resources) in cloud computing platform 1310. It is contemplated that resources can be configured for specific service applications. Further, each service application may be divided into functional portions such that each functional portion is able to run on a separate virtual machine. In cloud computing platform 1310, multiple servers may be used to run service applications and perform data storage operations in a cluster. In particular, the servers may perform data operations independently but exposed as a single device referred to as a cluster. Each server in the cluster can be implemented as a node.

Client device 1380 may be linked to a service application in cloud computing platform 1310. Client device 1380 may be any type of computing device, which may correspond to computing device 1300 described with reference to FIG. 13, for example. Client device 1380 can be configured to issue commands to cloud computing platform 1310. In embodiments, client device 1380 may communicate with service applications through a virtual Internet Protocol (IP) and load balancer or other means that direct communication requests to designated endpoints in cloud computing platform 1310. The components of cloud computing platform 1310 may communicate with each other over a network (not shown), which may include, without limitation, one or more local area networks (LANs) and/or wide area networks (WANs).

Example Computing Environment

Figure 14:
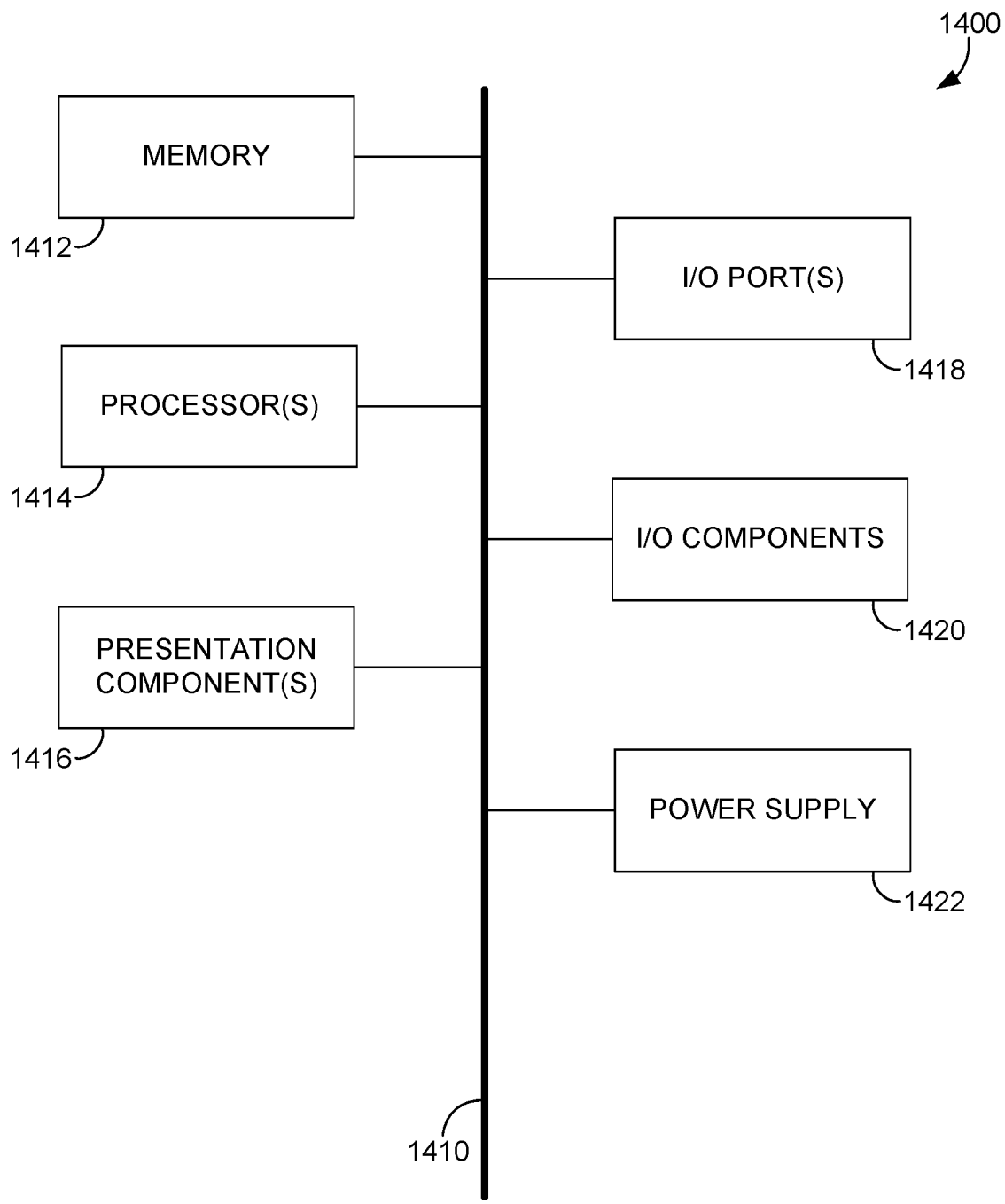
FIG. 14 is a block diagram of an example computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes bus 1410 that directly or indirectly couples the following devices: memory 1412, one or more processors 1414, one or more presentation components 1416, input/output ports 1418, input/output components 1420, and illustrative power supply 1422. Bus 1410 represents what may be one or more buses (such as an address bus, data bus, or combination thereof). The various blocks of FIG. 14 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 14 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc.

With reference to the distributed computing system synthetic data as a service, distributed computing system synthetic data as a service components refer to integrated components for providing a synthetic data as a service. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the distributed computing system synthetic data as a service can include an API library that includes specifications for routines, data structures, object classes, and variables may support the interaction between the hardware architecture of the device and the software framework of distributed computing system synthetic data as a service. These APIs include configuration specifications for the distributed computing system synthetic data as a service such that the different components therein can communicate with each other in the distributed computing system synthetic data as a service, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed computing system synthetic data as a service and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing a distributed computing system frameset assembly engine, the system comprising:
one or more hardware computer processors; and
computer memory storing computer-useable instructions, that when used by the one or more computer processors, cause the one or more hardware computer processors to perform operations comprising:
a frameset assembly engine configured to:
access a synthetic data scene;
determine a first set of values for scene-variation parameters, wherein the first set of values are automatically determined for generating a synthetic data scene frameset using a synthetic data as a service (SDaaS) integrated development environment (IDE) associated with both SDaaS distributed computing service operations and SDaaS machine-learning training service operations that are part of a service-oriented architecture of an SDaaS service, wherein the service-oriented architecture abstracts underlying the SDaaS distributed computing service operations that are managed via the SDaaS service from the SDaaS machine-learning training service operations,
wherein the SDaaS distributed computing service operations comprise storing and retrieving source assets at varying levels of detail for performing the SDaaS machine-learning training service operations on the source assets associated with the synthetic data scene;
based on the SDaaS service, generate the synthetic data scene frameset based on the first set of values, wherein the synthetic data scene frameset comprises at least a first frame in the frameset comprising the synthetic data scene updated based on a value for a scene-variation parameter; and
storing the synthetic data scene frameset.

2. The system of claim 1, wherein a second set of values for scene-variation parameters are manually selected for generating the synthetic data scene frameset.

3. The system of claim 2, wherein the second set of values are manually selected using the SDaaS IDE that supports a machine-learning synthetic data standard comprising a file format and a dataset-training architecture.

4. The system of claim 1, wherein the value for the scene-variation parameter is based on a training dataset report of a previous synthetic data scene frameset associated with the synthetic data scene.

5. The system of claim 1, wherein generating the synthetic data scene frameset comprises iteratively generating frames for the synthetic data scene frameset based on updating the synthetic data scene based on the first set of values.

6. The system of claim 1, wherein at least one SDaaS distributed computing service operation, managed via the SDaaS service, supports distributed computing availability of synthetic data assets, wherein the at least one SDaaS distributed computing service operation is different from the SDaaS machine-learning training service operations.

7. The system of claim 1, the synthetic data scene comprises a synthetic data asset, wherein the synthetic data asset is associated with asset-variation parameters and the scene-variation parameters, wherein the asset-variation parameters and the scene-variation parameters are programmable for machine-learning.

8. One or more computer storage media storing instructions thereon for implementing a distributed computing system frameset assembly engine, which, when executed by one or more processors of a computing device cause the computing device to perform actions comprising:
    accessing a synthetic data scene;
    determining a first set of values for scene-variation parameters, wherein the first set of values are automatically determined for generating a synthetic data scene frameset using a synthetic data as a service (SDaaS) integrated development environment (IDE) associated with both SDaaS distributed computing service operations and SDaaS machine-learning training service operations that are part of a service-oriented architecture of an SDaaS service, wherein the service-oriented architecture abstracts underlying the SDaaS distributed computing service operations that are managed via the SDaaS service from the SDaaS machine-learning training service operations,
    wherein the SDaaS distributed computing service operations comprise storing and retrieving source assets at varying levels of detail for performing the SDaaS machine-learning training service operations on the source assets associated with the synthetic data scene;
    based on the SDaaS service, generating the synthetic data scene frameset based on the first set of values, wherein the synthetic data scene frameset comprises at least a first frame in the frameset comprising the synthetic data scene updated based on a value for a scene-variation parameter; and
    storing the synthetic data scene frameset.

9. The media of claim 8, wherein a second set of values for scene-variation parameters are manually selected for generating the synthetic data scene frameset.

10. The media of claim 8, wherein the value for the scene-variation parameter is based on a training dataset report of a previous synthetic data scene frameset associated with the synthetic data scene.

11. The media of claim 8, wherein generating the synthetic data scene frameset comprises iteratively generating frames for the synthetic data scene frameset based on updating the synthetic data scene based on the first set of values.

12. The media of claim 8, wherein the synthetic data scene comprises a synthetic data asset.

13. The media of claim 12, wherein the synthetic data scene comprises a mapping to the synthetic data asset.

14. The media of claim 12, wherein the synthetic data asset is associated with asset-variation parameters and the scene-variation parameters, wherein the asset-variation parameters and the scene-variation parameters are programmable for machine-learning.

15. A computer-implemented method for implementing a distributed computing system frameset assembly engine, the method comprising:
    accessing a synthetic data scene;
    determining a first set of values for scene-variation parameters using a synthetic data as a service (SDaaS) integrated development environment (IDE) associated with both SDaaS distributed computing service operations and SDaaS machine-learning training service operations that are part of a service-oriented architecture of an SDaaS service, wherein the service-oriented architecture abstracts underlying the SDaaS distributed computing service operations that are managed via the SDaaS service from the SDaaS machine-learning training service operations,
    wherein the SDaaS distributed computing service operations comprise storing and retrieving source assets at varying levels of detail for performing the SDaaS machine-learning training service operations on the source assets associated with the synthetic data scene;
    based on the SDaaS service, generating the synthetic data scene frameset based on the first set of values, wherein the synthetic data scene frameset comprises at least a first frame in the frameset comprising the synthetic data scene updated based on a value for a scene-variation parameter; and
    storing the synthetic data scene frameset.

16. The method of claim 15, wherein the first set of values for scene-variation parameters are automatically selected for generating the synthetic data scene frameset.

17. The method of claim 15, wherein the first set of values for scene-variation parameters are manually selected for generating the synthetic data scene frameset.

18. The method of claim 15, wherein the value for the scene-variation parameter is based on a training dataset report of a previous synthetic data scene frameset associated with the synthetic data scene.

19. The method of claim 15, wherein generating the synthetic data scene frameset comprises iteratively generating frames for the synthetic data scene frameset based on updating the synthetic data scene based on the first set of values.

20. The method of claim 15, wherein the synthetic data scene comprises a synthetic data asset, wherein the synthetic data asset is associated with asset-variation parameters and the scene-variation parameters, wherein the asset-variation parameters and the scene-variation parameters are programmable for machine-learning.

* * * * *